United States Patent
Hsieh

(10) Patent No.: US 9,019,994 B2
(45) Date of Patent: Apr. 28, 2015

(54) SINGLE WIRE SIGNAL REGENERATION TRANSMITTING APPARATUS AND METHOD AND SERIALLY CONNECTED SINGLE WIRE SIGNAL REGENERATION TRANSMITTING APPARATUSES

(71) Applicant: Macroblock, Inc., Hsinchu (TW)

(72) Inventor: Shun-Ching Hsieh, Hsinchu (TW)

(73) Assignee: Macroblock, Inc., Hsinchu (TW)

( * ) Notice: Subject to any disclaimer, the term of this patent is extended or adjusted under 35 U.S.C. 154(b) by 214 days.

(21) Appl. No.: 13/730,382

(22) Filed: Dec. 28, 2012

(65) Prior Publication Data

US 2014/0003453 A1    Jan. 2, 2014

(30) Foreign Application Priority Data

Jun. 29, 2012   (TW) .............................. 101123593 A

(51) Int. Cl.
| | |
|---|---|
| *H04L 29/02* | (2006.01) |
| *H04L 5/24* | (2006.01) |
| *H04L 25/02* | (2006.01) |
| *H04L 25/24* | (2006.01) |
| *H04L 25/49* | (2006.01) |
| *H04J 3/07* | (2006.01) |
| *H04L 7/04* | (2006.01) |

(52) U.S. Cl.
CPC . *H04L 29/02* (2013.01); *H04J 3/07* (2013.01); *H04L 5/24* (2013.01); *H04L 25/0264* (2013.01); *H04L 25/245* (2013.01); *H04L 25/49* (2013.01); *H04L 2007/045* (2013.01)

(58) Field of Classification Search
CPC ........................................................ H04L 29/02
USPC ........................................................ 370/476
See application file for complete search history.

(56) References Cited

U.S. PATENT DOCUMENTS 5,461,661 A * 10/1995 Buttle ............................... 379/3
2010/0054313 A1 * 3/2010 Chu et al. ....................... 375/220

* cited by examiner

*Primary Examiner* — Dang Ton
*Assistant Examiner* — Mewale Ambaye
(74) *Attorney, Agent, or Firm* — Tim Tingkang Xia, Esq.; Morris, Manning & Martin, LLP

(57) ABSTRACT

A single wire signal regeneration transmitting apparatus receives a serial packet including a plurality of signal segments, and each of the signal segments includes a data field and a stuff time symbol. Each of the data fields, which is followed by each of the stuff time symbols, includes multiple logic 0/1 signal symbols, with accumulated numbers of the logic 0/1 signal symbols in each of the data fields being the same. The single wire signal regeneration transmitting apparatus is adapted to process the serial packet to sequentially output the signal segments, and after the single wire signal regeneration transmitting apparatus outputs the data field from a previously received signal segment, the single wire signal regeneration transmitting apparatus continues outputting the stuff time symbol until starting to process a next received signal segment received subsequent to a currently received signal segment in the received serial package.

12 Claims, 6 Drawing Sheets

ABSTRACT# SINGLE WIRE SIGNAL REGENERATION TRANSMITTING APPARATUS AND METHOD AND SERIALLY CONNECTED SINGLE WIRE SIGNAL REGENERATION TRANSMITTING APPARATUSES

CROSS-REFERENCE TO RELATED APPLICATIONS

This non-provisional application claims priority under 35 U.S.C. §119(a) on Patent Application No(s). 101123593 filed in Taiwan, R.O.C. on Jun. 29, 2012, the entire contents of which are hereby incorporated by reference.

BACKGROUND

1. Technical Field

The disclosure relates to a signal processing apparatus, and more particularly to a single wire signal regeneration transmitting apparatus and method and serially connected single wire signal regeneration transmitting apparatuses.

2. Related Art

In recent years, utilizing light-emitting diodes for the lightning of the building appearance, device lighting, environment lighting, and other lighting equipment has gradually gained its momentum. For example, pixel clusters (RGB clusters) formed by red, blue, and green light emitting diodes, which are associated with diverse lightning effects, have been connected in series when used in different lighting bodies for rendering possible long-distance lighting strings.

Such lighting equipments are mostly designed according to the appearance of the architecture. When the desired lighting coverage of the building is greater or the lighting design is more complicated, a greater number of light-emitting diode (LED) driver ICs must be connected in series to form a longer string of the pixel clusters.

However, control signals for controlling all stages of the LED driver IC in such a long string and serially connected pixel cluster are not a single global signal. For example, the control signal for the LED driver IC in one stage may come from the control signal for the LED driver IC in the previous stage. Therefore, the control signal that is inputted into one stage may be shifted in its duty cycle as the result of the transmission, and that may lead to distortion in later stages because of the cumulative effect of the shifts occurring in the previous stages. To solve this problem, conventional methods directly compensate the control signal before the control signal is inputted into the next stage. However, the compensated control signal may only target the distortions of certain types and not be the "one-size-fits-all" solution for all above-mentioned shifts.

In addition, in the context of the serially connected stages noises in the previous stages may propagate into subsequent stages, affecting all serially subsequent connected stages. In short, the propagation of the noises that enter into the picture of the transmission at one stage may further result in the erroneous decoding in the subsequent stages, leaving the conventional control circuits to be desired.

SUMMARY

In view of the above problems, the instant disclosure discloses a single wire signal regeneration transmitting apparatus and method and serially connected single wire signal regeneration transmitting apparatuses. The proposed apparatus is capable of synchronously transmitting the signals and minimizing the accumulation of the signal attenuation and the propagation of the noises.

The instant disclosure discloses a single wire signal regeneration transmitting apparatus for receiving and transmitting a serial packet. The serial packet has a plurality of signal segments, wherein each of the signal segments includes a data field and a stuff time symbol. The data field has multiple logic 0/1 signal symbols, and the accumulated numbers of the logic 0/1 signal symbols in each of the data fields are the same. Each of the data fields is followed by the stuff time symbol. The single wire signal regeneration transmitting apparatus processes the serial packet to output the signal segments sequentially. After the single wire signal regeneration transmitting apparatus outputs the data field which is from the previous inputting signal segment, the single wire signal regeneration transmitting apparatus continues outputting the stuff time symbol until the single wire signal regeneration transmitting apparatus starts to processes the next inputting signal segment in the received serial packet, which may be the current inputting signal segment.

In one embodiment, at the time the single wire signal regeneration transmitting apparatus begins to process the current inputting signal segment, the same single wire signal regeneration transmitting apparatus begins to output the data field from the previous inputting signal segment. And the current inputting signal segment is subsequent to the previous inputting signal segment in the received serial package.

In one embodiment, the time duration of each of the signal segments received by the single wire signal regeneration transmitting apparatus is the same as the time duration of each of the signal segments outputted by the single wire signal regeneration transmitting apparatus.

In one embodiment, the time duration of each of the data fields outputted by the single wire signal regeneration transmitting apparatus is fixed. The duty cycles of each of the logic 0 signal symbols and each of the logic 1 signal symbols are fixed as well.

In one embodiment, the time duration of each of the stuff time symbols outputted by the single wire signal regeneration transmitting apparatus is adjustable.

In one embodiment, the single wire signal regeneration transmitting apparatus resets if failing to receive the serial packet within a predetermined period of time.

In one embodiment, when the single wire signal regeneration transmitting apparatus processes the current inputting signal segment, the single wire signal regeneration transmitting apparatus counts the logic 0/1 signal symbols in the data field of the current inputting signal segment in order to generate a counting number. The single wire signal regeneration transmitting apparatus determines whether the counting number and a preset number match. If the counting number does not match the preset number, the single wire signal regeneration transmitting apparatus stops outputting any signal segments until the single wire signal regeneration transmitting apparatus resets. And after the single wire signal regeneration transmitting apparatus resets it may receive and process the next inputting serial packet.

In one embodiment, the logic 0 signal symbol, the logic 1 signal symbol, and the stuff time symbol are RZ code.

In one embodiment, the single wire signal regeneration transmitting apparatus includes a signal decoder, a signal register, and a signal encoder. The signal decoder receives the serial packet and decodes every signal segment of the serial packet in order to generate a corresponding bit segment when receiving the stuff time symbol. The signal register is coupled to the signal decoder for storing the bit segments sequentially.

When the signal decoder decodes the current signal segment, the signal register outputs the bit segments associated with the data field of the previous inputting signal segment. The signal encoder is coupled to the signal register to receive the bit segments, and transforms each of the bit segments to the data field for output. Thereafter, the signal encoder outputs the stuff time symbol until the signal decoder starts to decode next inputting signal segment.

In one embodiment, the single wire signal regeneration transmitting apparatus further comprises a first controller and a selector. The first controller is coupled to the signal decoder to receive the serial packet and the stuff time informing signal in order to confirm the location of the stuff time symbol at the serial packet, and to count the counting numbers of the logic 0/1 signal symbols between the two stuff time symbols before outputting a first control signal. Each of the stuff time informing signals corresponds to each of the stuff time symbols. The selector is coupled to the signal encoder and the first controller for receiving the first control signal, an idle signal and the signal segments outputted from the signal encoder. Then, the selector selects the signal segments outputted from the signal encoder, or the idle signal as the output.

In one embodiment, the single wire signal regeneration transmitting apparatus further includes a second controller and a signal processor. The second controller is coupled to the signal decoder to receive the stuff time symbol informing signals and counts the stuff time symbol informing signals in order to output the second control signal. Each of the multiple stuff time symbols corresponds to one of the stuff time symbols in received serial package. The signal processor is coupled to the signal register and the second controller to receive the bit segments of the signal register and the second control signal. The processor decides whether to copy the bit segments of the signal register according to the second control signal.

In one embodiment, the single wire signal regeneration transmitting apparatus further includes a detector. The detector is coupled to the signal decoder to detect whether the signal decoder receives the serial packet continuously in order to generate a reset signal to reset the single wire signal regeneration transmitting apparatus.

The instant disclosure further discloses a serially connected single wire signal regeneration transmitting apparatuses. The single wire signal regeneration transmitting apparatuses are serially connected, wherein the time duration of the data fields in the signal segments received by the first single wire signal regeneration transmitting apparatus is the first time duration, and the time duration of the data fields of the signal segments outputted by all single wire signal regeneration transmitting apparatuses is the second time duration. The second time duration is fixed, and the first time duration is greater than the second time duration, and the time duration of each of the signal segments outputted by the single wire signal regeneration transmitting apparatus is equal to the time duration of the signal segment received by the first single wire signal regeneration transmitting apparatus.

In one embodiment, each of the signal segments may correspond to the single wire signal regeneration transmitting apparatus one by one, and each of the signal segments in the serial packet is outputted to the single wire signal regeneration transmitting apparatus in a reversed order.

The instant disclosure discloses a method utilized by the single wire signal regeneration transmitting apparatus. The method includes receiving a serial packet having multiple signal segments. Each of the signal segments includes a data field and a stuff time symbol, each of the data fields has multiple logic 0/1 signal symbols, the accumulated numbers of the logic 0/1 signal symbols in each of the data fields are the same, and each of the data fields is followed by the stuff time symbols. The method includes processing the serial packet in order to output the signal segments sequentially, and after each single wire signal regeneration transmitting apparatus outputs the data field of the current signal segment, it outputs the stuff time symbols until it starts to process the next inputting signal segment.

The instant disclosure further discloses the single wire signal regeneration transmitting apparatus and method utilizing the same and the serially connected single wire signal regeneration transmitting apparatuses. The single wire signal regeneration transmitting apparatus is capable of synchronously transmitting the signals due to the time duration of the signal segments outputted by the single wire signal regeneration transmitting apparatus has been set to be the same as the time duration of the signal segments received by the first one of the serially connected single wire signal regeneration transmitting apparatuses. Furthermore, the single wire signal regeneration transmitting apparatus outputs logic 0/1 signal symbols in approximately fixed operating period and time duration, so as to minimize the cumulative effect of the signal attenuation. Next, the apparatus in every stage receives the signal segments simultaneously by having the sequence of the signal segments of the serial packet properly arranged. In addition, the single wire signal regeneration transmitting apparatus may minimize the propagation of the noise by checking the numbers of the logic 0/1 signal symbols between two stuff time symbols.

DETAILED DESCRIPTION

Figure 1:
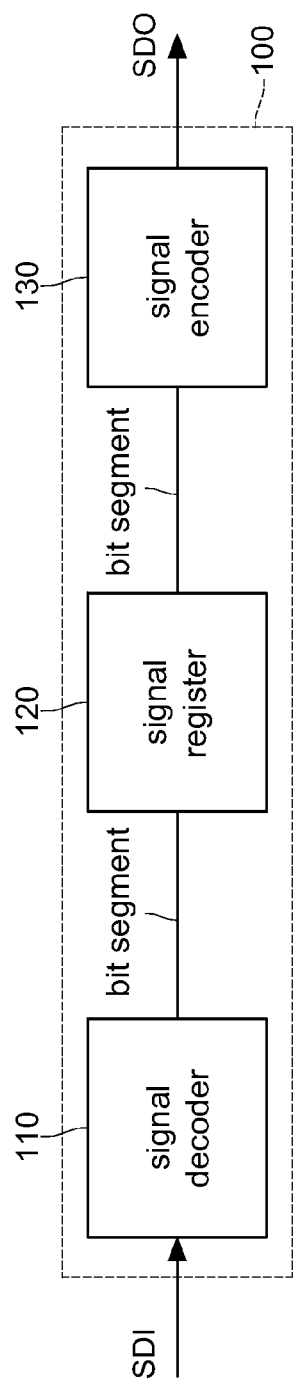
FIG. 1 is a schematic diagram of a single wire signal regeneration transmitting apparatus according to one embodiment of the instant disclosure.
Figure 2:
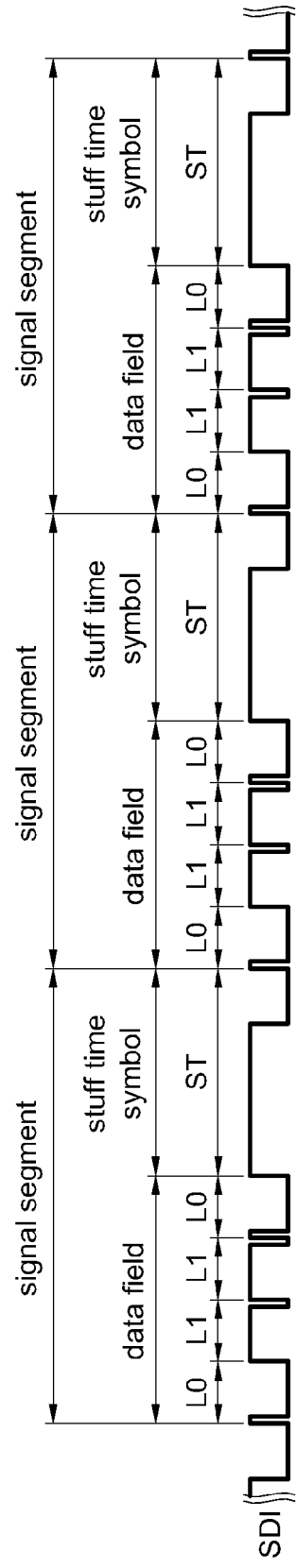
FIG. 2 is a relation diagram of a serial packet, a signal segment, a data field, a logic 0/1 signal symbol, and a stuff time symbol according to one embodiment of the instant disclosure.

FIG. 1 illustrates the schematic view of a single wire signal regeneration transmitting apparatus 100. The single wire signal regeneration transmitting apparatus 100 is applied to receive serial packets, wherein each of the serial packets (SDI) has a plurality of signal segments (or in other words, the serial packet is formed by a plurality of signal segments). Each of the signal segments includes a data field and a stuff time symbol (ST). Furthermore, each of the data fields includes multiple logic 0/1 signal symbols, and an accumulated number of the logic 0/1 signal symbols in each of the data fields are the same. Each of the stuff time symbols ST is adapted to follow each of the data fields in the signal segments, as shown in FIG. 2.

According to the embodiment, the single wire signal regeneration transmitting apparatus 100 is applied to receive a serial packet, and process the serial packet to output the signal segments (SDO) sequentially. During the single wire signal regeneration transmitting apparatus 100 receives the current inputting signal segment (e.g., a second signal segment), the single wire signal regeneration transmitting apparatus 100 outputs the data field which is from previous inputting signal segment (e.g., a first signal segment). And after the single wire signal regeneration transmitting apparatus 100 finishes outputting the data field for the current inputting signal segment, the single wire signal regeneration transmitting apparatus 100 continues outputting the stuff time symbol (ST) until it starts to process the next inputting signal segment (e.g., a third signal segment). The stuff time symbol (ST) is adapted to ensure the time duration of each of the signal segments (SDO) outputted by the single wire signal regeneration transmitting apparatus 100 would be substantially the same as the time duration of each of the signal segments (SDI) the same single wire signal regeneration transmitting apparatus 100 receives.

Furthermore, the single wire signal regeneration transmitting apparatus 100 includes a signal decoder 110, a signal register 120, and a signal encoder 130. The signal decoder 110 is applied to receive and decode the serial packet SDI.

The signal decoder 110 generates a corresponding bit segment after decoding every signal segment in the serial packet SDI. Since the signal register 120 is coupled to the signal decoder 110 for storing the bit segments outputted by the signal decoder 110 sequentially, after the signal decoder 110 decodes one signal segment (e.g., the first signal segment) the signal decoder 110 outputs the bit segment (from the data field of the first signal segment) to the signal register 120 where the first signal segment is stored temporarily. Similarly, when the signal decoder 110 decodes another signal segment (e.g., the second signal segment), the signal decoder 110 outputs the bit segment corresponding to the second signal segment (from the data field of the second signal segment) to the signal register 120 where the second signal segment is temporarily stored. The signal register 120 stores the signal segments in a bit format while the signal decoder 110 generates a corresponding stuff time informing signal after receiving the stuff time symbol ST.

When the signal decoder 110 decodes the current signal segment, the signal register 120 may output the bit segment corresponding to the data field of the previous signal segment. That is to say, when the signal decoder 110 decodes the second signal segment, the signal register 120 outputs the first bit segment, which may correspond to the data field of the first signal segment that has been stored in the signal register 120. When the signal decoder 110 decodes another signal segment (e.g., the third signal segment), the signal register 120 outputs the second bit segment, which may correspond to the data field of the second signal segment that has been stored in the signal register 120.

The signal encoder 130 is coupled to the signal register 120. If the signal register 120 outputs the bit segment to the signal encoder 130, the signal encoder 130 transforms the received bit segment to the corresponding signal segment SDO for output. Furthermore, the signal encoder 130 is adapted to attach the stuff time symbol ST to the data field of the signal segment until the signal decoder 110 starts to decode the next received signal segment SDI.

Specifically, when the signal decoder 110 decodes the second signal segment, which may trigger the transmission of the first bit segment from the signal register 120 to the signal encoder 130, the signal encoder 130 transforms the first bit segment to the data field of the corresponding signal segment SDO. In short, the signal encoder 130 receives the bit segments in sequence, and transforms the same to the data fields of the corresponding signal segments SDO in the same sequence for output purpose. Then, the signal encoder 130 continuous to output stuff time symbol ST after outputting each data field of the signal segment SDO. Specifically speaking, the signal encoder 130 converts the bit segments to the data fields of the signal segments SDO in terms of one-bit unit.

In the current embodiment, when the signal decoder 110 of the single wire signal regeneration transmitting apparatus 100 receives and decodes the current signal segment (e.g., the second signal segment), the signal register 120 stores the bit segment corresponding to the data field of the previous signal segment (or the data field of the first signal segment) and transmits the same to the signal encoder 130. Therefore, the signal encoder 130 can output the data field corresponding to the bit segment stored in the signal register 120 when the signal decoder 110 is decoding the current signal segment (e.g., the second signal segment).

Furthermore, the duty cycle and the time duration of the logic 0 signal symbol L0 outputted by the signal encoder 130 are fixed, and the duty cycle and the time duration of the logic 1 signal symbol L1 outputted by the signal encoder 130 are fixed also. Since the signal transmission process is generally subject to attenuation in the signal transmitted, according to the above mentioned features of the embodiment, maintaining the duty cycles and the time durations of the logic 0 signal symbol and logic 1 signal symbol may prevent the signals transmitted from being attenuated over the course of the transmission, limiting the occurrence of the signal attenuation at the signal decoder 110 and minimizing the impact of the signal attenuation on the output of the signal encoder 130.

In addition, the time duration of the stuff time symbol ST outputted by the signal encoder 130 is adjustable. As a result, regardless of the signal attenuation associated with the signal transmission along with the attachment of the stuff time symbol ST to the data field, the time duration of each of the signal segments received by the signal decoder 110 could be the same as the time duration of each of the signal segments SDO outputted by the signal encoder 130.

Figure 3:
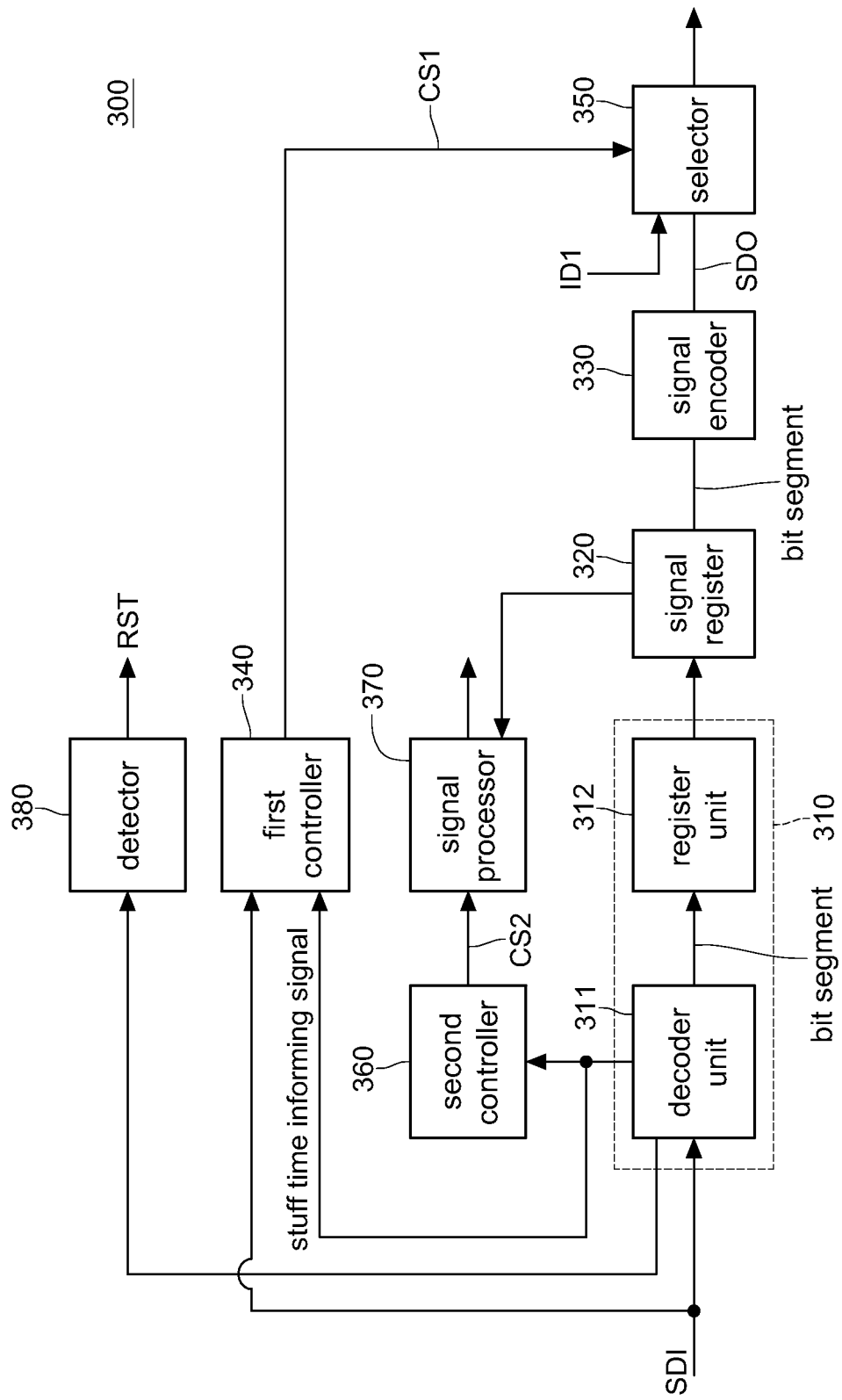
FIG. 3 is a detailed schematic diagram of a single wire signal regeneration transmitting apparatus according to one embodiment of the instant disclosure.
Figure 4:
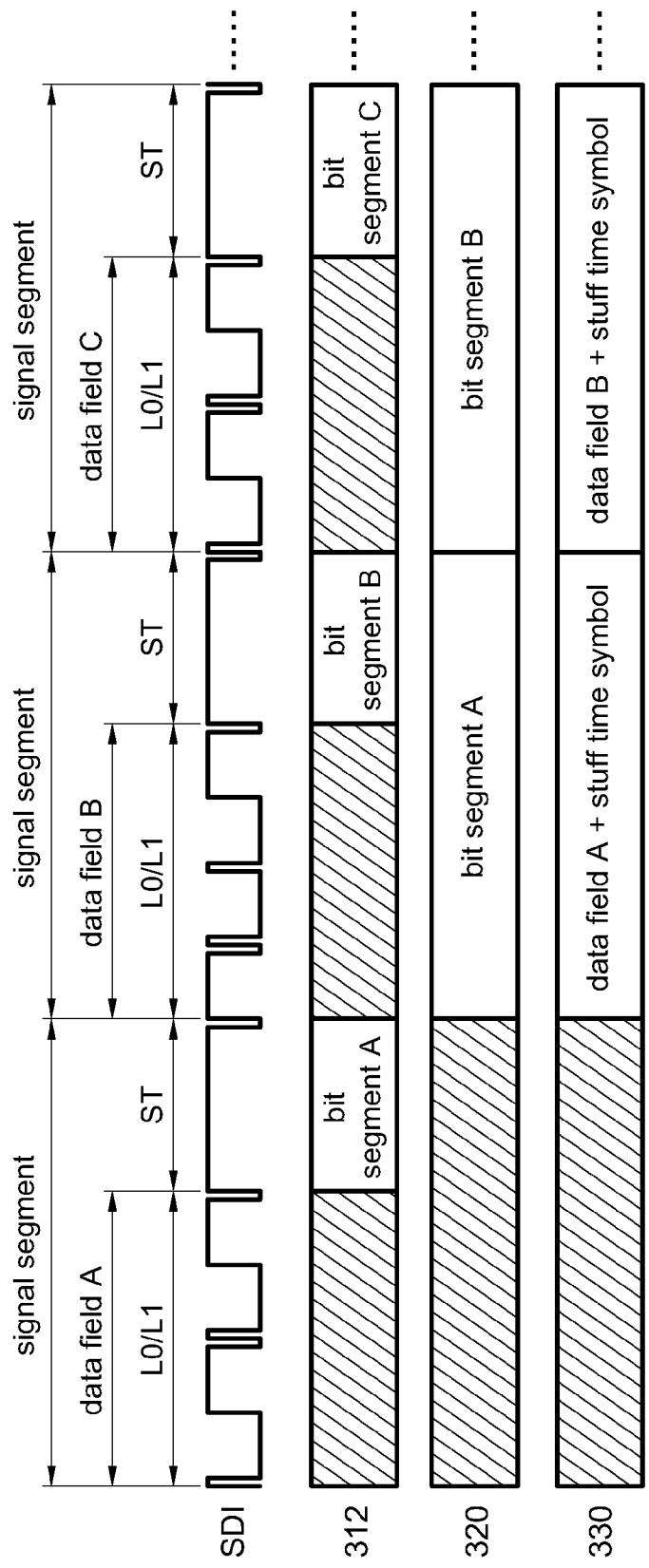
FIG. 4 is the signal transmission diagram of the signal decoder unit, the signal register unit, and the signal encoder unit according to one embodiment in the instant disclosure.

FIG. 3 illustrates a detailed schematic view of a single wire signal regeneration transmitting apparatus 300 according to one embodiment of the instant disclosure. Referring to FIG. 4, FIG. 4 illustrates the diagram of the signal transform between a decoder unit, a decoding register unit, signal register, and a signal encoder. The single wire signal regeneration transmitting apparatus 300 includes a signal decoder 310, a signal register 320, a signal encoder 330, a first control signal 340, a selector 350, a second controller 360, a signal processor 370, and a detector 380.

The signal decoder 310 further includes a decoder unit 311 and a decoding register unit 312. The decoding register unit 312 is coupled to the decoder unit 311 for storing the decoding result of decoder unit 311 bit by bit, and after decoder unit 311 stops decoding the data field of any signal segment, all bits in decoding register unit 312 represents a bit segment.

After the decoder unit 311 wraps up the decoding of the new signal segment SDI, the decoding register unit 312 may output the bit segment. The signal register 320 is coupled to the decoding register unit 312 and the signal encoder 330 for receiving the bit segments sequentially, and further transmitting the bit segments sequentially to the signal encoder 330. In the embodiment, the decoding register unit 312 is a shifter, and the signal register 320 is a buffer. Furthermore, the signal decoder 310 generates a stuff time informing signal after receiving the stuff time symbol ST.

After the signal decoder 310 generates the first stuff time informing signal (from the stuff time after the data field A), the decoding register unit 312 may output the first bit segment to the signal register 320 right away in order to start storing the second signal segment. And after the signal decoder 310 generates the second stuff time informing signal (from the stuff time after the data field B), the decoding register unit 312 may output the second bit segment to the signal register 320 right away in order to start storing the third signal segment.

When the decoding register 312 outputs the first bit segment to the signal register 320, the signal register 320 provides the first bit segment to the signal encoder 330 right away, so that the signal encoder 330 can encode the first bit segment to generate the corresponding data field of the first signal segment SDO. When the decoding register 312 outputs the second bit segment to the signal register 320, the signal register 320 provides the second bit segment to the signal encoder 330 right away, so that the signal encoder 330 can encode the second bit segment to generate the corresponding data field of the second signal segment SDO.

In the embodiment, after the signal encoder 330 complete to output of the data field of the signal segment SDO, the signal encoder 330 attaches the stuff time symbol ST to the data field until the signal register 320 is updated (or when another signal segment is stored into the signal register 320). It is worth noting that the signal register 320 may be updated almost concurrently upon the signal decoder 310 finishes decoding the signal segment. Therefore, the stuff time symbol ST may be attached to the data field of the signal segment SDO until after the signal decoder 310 finishes decoding the signal segment SDI.

Figure 5:
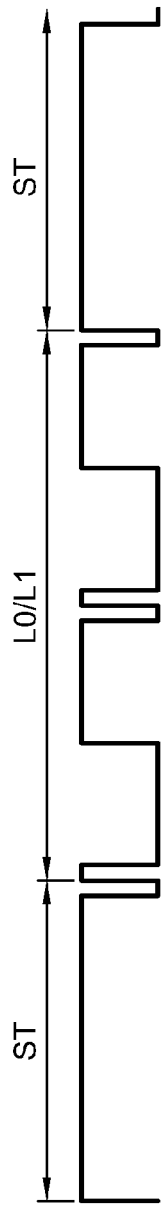
FIG. 5 is the schematic diagram of the logic 0/1 signal symbol between the two stuff time symbols according to one embodiment of the instant disclosure.
Figure 6:
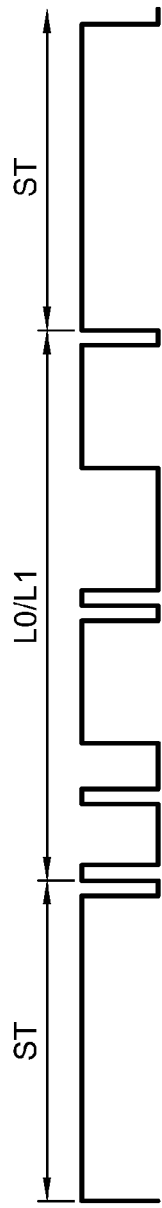
FIG. 6 is another schematic diagram of the logic 0/1 signal symbol between the two stuff time symbols according to one embodiment in the instant disclosure.

The first controller 340 is coupled to SDI and the signal decoder 310 to receive the stuff time informing signals for verifying the location of the stuff time symbol ST in the serial packet SDI. After verifying the location of the stuff time symbol ST, the first controller 340 counts the number of the logic 0/1 signal symbols between the two stuff time symbols ST and then determines whether the counted number matches a preset number. Assuming that the preset number is four and the accumulated number is also four as shown in FIG. 5, no noise may be found in the serial packet SDI. Assuming that the default preset number is four and the accumulated number is five as shown in FIG. 6, the noise may have been a part of the serial packet SDI. When the number of the logic 0/1 signal symbols matches the preset number, the controller 340 outputs the first control signal CS1 at its "high" logic level. Otherwise, the controller 340 outputs the first control signal CS1 at its "low" logic level.

In one implementation, the first controller 340 counts the numbers of the rising edges of the data fields as the accumulated numbers of the signal symbols.

The selector 350 is coupled to the signal encoder 330 to receive the outputting signal segments SDO, the first control signal CS1, and an idle signal ID1. And the selector 350 selects one of the signal segments SDO and the idle signal ID1 according to the first control signal CS1.

For example, when the first control signal CS1 is at its "high" logic level, the selector 350 selects the signal segments SDO generated by the signal encoder 330, so that this outputted signal segments SDO can be used by subsequent stages. When the first control signal CS1 is at its "low" logic level, the selector 350 selects the idle signal ID1 for output. This arrangement enables the same single wire signal regeneration transmitting apparatus 300 not to output the signal segments SDO to subsequent stages, minimizing the occurrence of the noise which may affect the decoding of the subsequent stages and further causing other components of the system to malfunction. The idle signal ID1 may be set to a low logic level signal, so that the decoding of subsequent stages may be suspended upon the receipt of such low logic level signal.

The second controller 360 is coupled to the signal decoder 310 to receive and count the number of the stuff time informing signals, so as to output the second control signal CS2. Furthermore, the second controller 360 may compare the number of the stuff time informing signals with another preset number. When the number of the stuff time informing signals matches the preset number, the second control signal CS2 at its "high" logic level is outputted. Otherwise, the second control signal CS2 at its "low" logic level is outputted.

The signal processor 370 is coupled to the signal register 320 and the second controller 360, so as to receive the bit segment of the signal register 320 and the second control signal CS2. The signal processor 370 decides whether to copy the bit segment of the signal register 320 or not according to the second control signal CS2.

For example, it is assumed that the signal processor 370 needs to copy the bit segments of the signal register 320 after receiving the second stuff time symbol ST. If the second controller 360 calculates that the number of the stuff time informing signals is two, the second controller 360 outputs the second control signal CS2 at its high logic level and then the signal processor 370 copies the bit segments in the signal register 320 for the further processing. Otherwise, the signal processor 370 does not copy the bit segments in the signal register 320.

The detector 380 is coupled to the signal decoder 310 for determining whether the signal decoder 310 receives the serial packet SDI continuously, before generating a rest signal RST to reset the single wire signal regeneration transmitting apparatus 300. And the reset signal RST may set the first control signal CS1 and the second control signal CS2 to their "low" logic levels. In one implementation, if the single wire signal regeneration transmitting apparatus 300 does not receive the serial packet SDI within a predetermined period of time, the single wire signal regeneration transmitting apparatus 300 may be reset. As a result, the single wire signal regeneration transmitting apparatus may recover from potential malfunctioning such as erroneous decoding caused by the noises and return to normal before any further signal processing may be performed.

Figure 7:
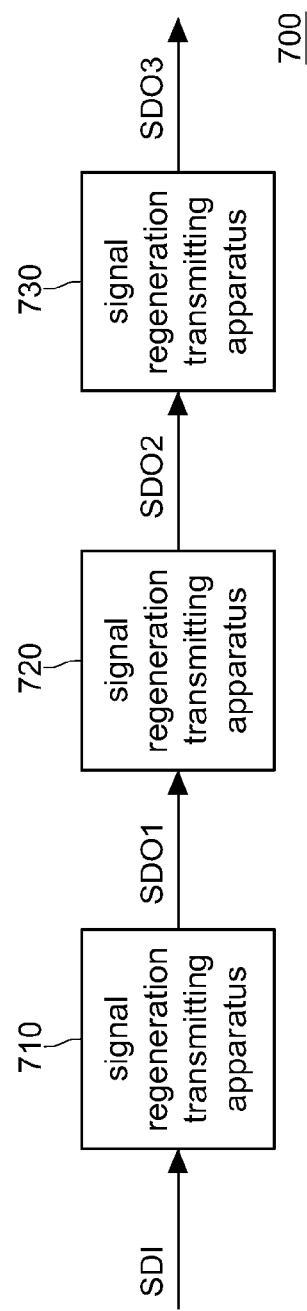
FIG. 7 is a schematic diagram of a serially connected single wire signal regeneration transmitting apparatuses according to one embodiment of the instant disclosure.
Figure 8:
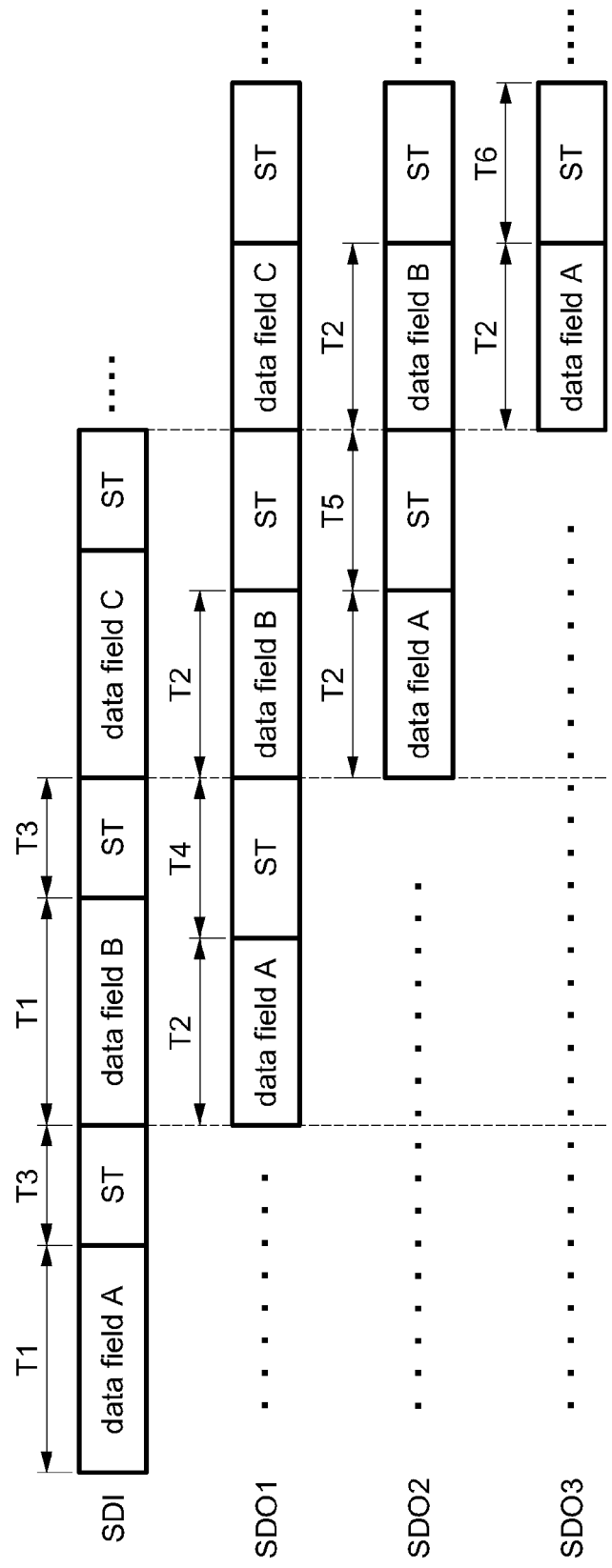
FIG. 8 is a relation diagram of a serial packet SDI, a signal segments SDO1, SDO2, and SDO3 according to one embodiment of the instant disclosure.

Please refer to FIG. 7 where a schematic view of a serially connected single wire signal regeneration transmitting apparatus is shown. FIG. 8 meanwhile illustrates the relations between the serial packet SDI, the signal segments SDO 1, SDO2, and SDO 3 according to one embodiment of the instant disclosure. The serially connected single wire signal regeneration transmitting apparatus 700 includes multiple single wire signal regeneration transmitting apparatuses 710, 720, and 730, which are serially connected. The example coupling relations and the operating process of the internal components in the single wire signal regeneration transmitting apparatuses 710, 720, and 730 could be found in the embodiments in FIG. 1 and FIG. 3. The embodiment shown in FIG. 7 may only include three single wire signal regeneration transmitting apparatuses as an example. However, the number of the single wire signal regeneration transmitting apparatuses is not limited as the result.

The serially connected single wire signal regeneration transmitting apparatus 700 receives the serial packet SDI formed by a plurality of signal segments through the single wire signal regeneration transmitting apparatus 710, which may be regarded as the first stage device in the embodiment. Each of the signal segments includes a data field and a stuff time symbol, and each data field includes multiple logic 0/1 signal symbols. The accumulated numbers of the logic 0/1 signal symbols in all the data fields are the same, with one stuff time symbol following each of the data fields.

Assume the time duration of each data field in the serial packet SDI that received by the single wire signal regeneration transmitting apparatus 710 is the first time duration T1, and the time duration of each data field in the signal segments SDO1, SDO2, and SDO3 that outputted by the single wire signal regeneration transmitting apparatuses 710, 720, and 730 may be the second time duration T2. The initial time of the first time duration T1 and the second time duration T2 (or where the first time duration T1 and the second time duration T2 start) are substantially the same, and the first time duration T1 is greater than the second time duration T2 (i.e., T1>T2).

Next, after the single wire signal regeneration transmitting apparatuses 710, 720, and 730 output the data fields (such as the data fields A, B, and C), they will output the stuff time symbols until the single wire signal regeneration transmitting apparatuses 710, 720, and 730 start to process the next inputting signal segment. Furthermore, assume that all the time duration of each of the stuff time symbols in the serial packet SDI is the third time duration T3, and the time duration of the stuff time symbols outputted by the single wire signal regeneration transmitting apparatuses 710, 720, and 730 are the time duration T4, T5, and T6 respectively.

As previously mentioned, because the first time duration T1 and the second time duration T2 are substantially the same, and the first time duration T1 is greater than the second time duration T2 (T1>T2), the time duration T4, T5, and T6 all start from the ending of data fields outputted by the single wire signal regeneration transmitting apparatus to the starting of signal segment inputted by the same single wire signal regeneration transmitting apparatus. Therefore, the time duration that the first time duration T1 plus the third time duration T3 (T1+T3), the second time duration T2 plus the fourth time duration T4 (T2+T4), the second time duration T2 plus the fifth time duration T5 (T2+T5), and the second time duration T2 plus the sixth time duration T6 (T2+T6) are almost the same. As such, the time duration of the signal segments outputted by the single wire signal regeneration transmitting apparatuses 710, 720, and 730 are approximately the same as the time duration of the signal segments inputted by single wire signal regeneration transmitting apparatus 710, which helps realize the synchronous transmission of the signal segments.

However, because of the processing variance, the time duration in each data field outputted by the single wire signal regeneration transmitting apparatuses 710, 720, and 730 may be slightly different from each other. But because the time duration T4, T5, and T6 all start from the ending of data fields outputted by the single wire signal regeneration transmitting apparatus to the starting of signal segment inputted by the same single wire signal regeneration transmitting apparatus, each of the single wire signal regeneration transmitting apparatuses 710, 720, and 730 can be adapted to adjust the time duration T4, T5, and T6 to compensate the differences of the time duration of the data fields outputted by the single wire signal regeneration transmitting apparatuses 710, 720, and 730, in order to ensure the time duration of signal segments inputted and outputted by the single wire signal regeneration transmitting apparatuses 710, 720, and 730 to be approximately the same.

The duty cycle and the time duration of the logic 0/1 signal symbols outputted by the single wire signal regeneration transmitting apparatuses 710, 720, and 730 may be fixed for minimizing the impact arising out of the transmission attenuation between single wire signal regeneration transmitting apparatuses 710, 720, and 730. In addition, because the time duration of the signal segment outputted and received by the single wire signal regeneration transmitting apparatuses 710-730 may be substantially the same along with the adjustable time duration of the stuff time symbols, the accumulation of the signal attenuation may be minimized without extra compensation while the transmission of the signal may still be synchronized.

The number of the signal segments included in the serial packet SDI may be the same as the number of the serially connected single wire signal regeneration transmitting apparatuses. In other words, in the embodiment with three single wire signal regeneration transmitting apparatuses, the number of signal segments in the serial packet SDI is also three. In addition, each of the signal segments includes a data field, with three signal segments having a data field A, a data field B, and a data field C, respectively. The data field A is for the single wire signal regeneration transmitting apparatus 730, the data field B is for the single wire signal regeneration transmitting apparatus 720, and the data field C is for the single wire signal regeneration transmitting apparatus 710.

The single wire signal regeneration transmitting apparatus 710 (or the first stage of the serially connected single wire signal regeneration transmitting apparatuses) decodes the signal segment with the data field A. The signal segment with the data field A is the first signal segment received by the single wire signal regeneration transmitting apparatus 710. In other words, no previously received data field is stored in the single wire signal regeneration transmitting apparatus 710, and no output is generated when the signal segment when the data field A is decoded. After the single wire signal regeneration transmitting apparatus 710 finishes processing the first signal segment with the data field A, the single wire signal regeneration transmitting apparatus 710 starts to decode the signal segment with the data field B at the same time when outputting the signal segment with the data field A to the single wire signal regeneration transmitting apparatus 720 as the second stage of the serially connected single wire signal regeneration transmitting apparatuses.

After the single wire signal regeneration transmitting apparatus 710 finishes processing the signal segment with the data field B, the single wire signal regeneration transmitting apparatus 710 starts to output the signal segment with the data field B to the single wire signal regeneration transmitting apparatus 720 when starting to decode the signal segment with the data field C.

Because the single wire signal regeneration transmitting apparatus 710 is arranged ahead of the single wire signal regeneration transmitting apparatus 720 in the serially connected single wire signal regeneration transmitting apparatuses 710-730 in the current example, the single wire signal regeneration transmitting apparatus 720 does not output any signal segment when decoding the signal segment with the data field A, which is the first signal segment received by the same single wire signal regeneration transmitting apparatus 720. After the single wire signal regeneration transmitting apparatus 720 finishes processing the signal segment with the data field A, the single wire signal regeneration transmitting apparatus 720 starts to decode the signal segment with the data field B at the same time when outputting the signal segment with the data field A to the single wire signal regeneration transmitting apparatus 730 as the third stage of the serially connected single wire signal regeneration transmitting apparatuses.

Similarly, because the single wire signal regeneration transmitting apparatus 730 is behind both the single wire signal regeneration transmitting apparatuses 710 and 720, the single wire signal regenerating apparatus 730 does not output any signal segment when decoding the signal segment with the data field A as the first signal segment received by the same single wire signal regeneration transmitting apparatus 730.

According to the signal processing mentioned above, since the number of the signal segments of the serial packet SDI is the same as the number of the single wire signal regeneration transmitting apparatuses, when the single wire signal regeneration transmitting apparatus 730 receives the signal segment with the data field A, the single wire signal regeneration transmitting apparatus 720 receives the signal segment with the data field B at the same time, and the single wire signal regeneration transmitting apparatus 710 receives the signal segment with the data field C also at the same time in one embodiment. And the data fields A, B, and C are for the single wire signal regeneration transmitting apparatuses 730, 720, and 710, respectively, so that each of the single wire signal regeneration transmitting apparatuses may receive the expected signal segments at the same time. Thereafter, the single wire signal regeneration transmitting apparatuses 710, 720, and 730 may learn which signal segment in the serial packet SDI should be received by counting the numbers of the stuff time symbols, before moving on to process the signal segments to realize the synchronous transmission of the signals.

Figure 9:
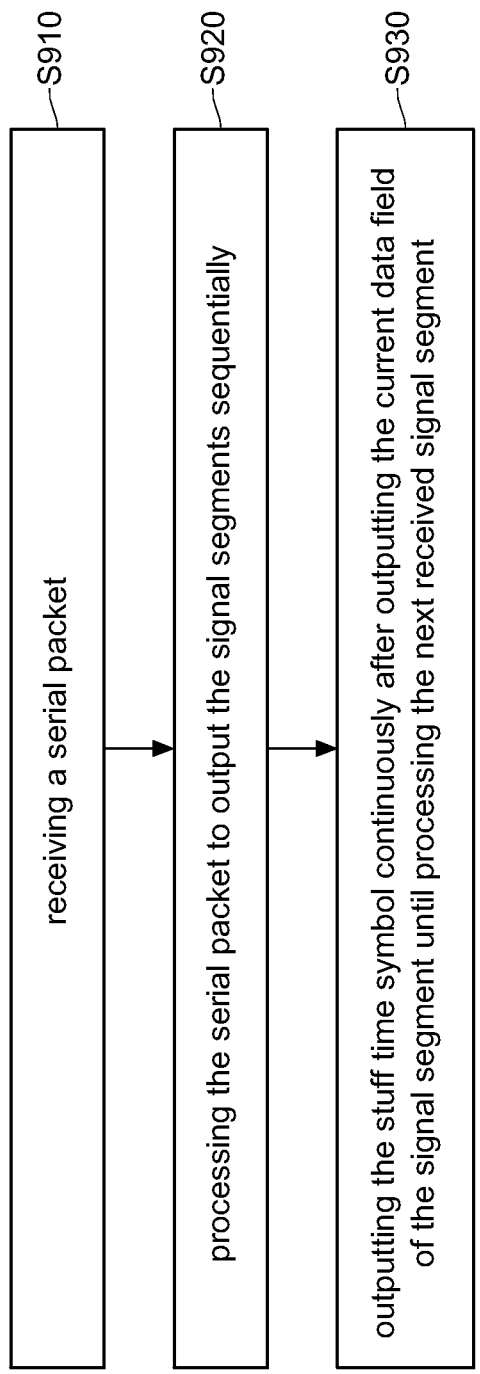
FIG. 9 is a flow chart of a method utilizing the single wire signal regeneration transmitting apparatus according to one embodiment of the instant disclosure.

Please refer to FIG. 9 where a flow chart utilizing the method illustrated in FIG. 1 by the single wire signal regeneration transmitting apparatus according to one embodiment of the instant disclosure is illustrated. Step S910 includes receiving a serial packet. Step S920 includes processing the serial packet to output the signal segments sequentially. Step S930 includes outputting the stuff time symbol continuously after outputting the data field of the current signal segment until processing the next inputting signal segment.

The instant disclosure discloses the single wire signal regeneration transmitting apparatus and the method using the same and the serially connected single wire signal regeneration transmitting apparatuses. For facilitating the synchronous transmission of the signals, the method proposed in the instant disclosure ensures the duty cycle and the time duration of logic 0/1 signal symbols outputted by single wire signal regeneration transmitting apparatus are approximately fixed, so as to minimize the cumulative effect associated with the signal attenuation in the transmission. Next, the proposed method may enable the multiple single wire signal regeneration transmitting apparatuses to receive their corresponding signal segments/data fields simultaneously by properly arranging the sequence of the signal segments of the serial packet. In addition, the single wire signal regeneration transmitting apparatus avoids the occurrence of noise propagation by checking the numbers of the logic 0/1 signal symbols between two stuff time symbols.

What is claimed is:

1. A single wire signal regeneration transmitting apparatus, wherein the single wire signal regeneration transmitting apparatus receives a serial packet including a plurality of signal segments, each of the signal segments includes a data field and a stuff time symbol, each of the data fields includes multiple logic 0/1 signal symbols, with accumulated numbers of the logic 0/1 signal symbols in each of the data fields being the same, each of the data fields is followed by each of the stuff time symbols, the single wire signal regeneration transmitting apparatus is adapted to process the serial packet to sequentially output the signal segments, and at the time the single wire signal regeneration transmitting apparatus begins to process a currently received signal segment, and the single wire signal regeneration transmitting apparatus outputs the data field from a previously received signal segment and outputs the stuff time symbols until starting to process a next received signal segment in the received serial packet; and wherein the single wire signal regeneration transmitting apparatus further comprises:

a signal decoder for receiving the serial packet and decoding each of the signal segments of the serial packet, in order to generate a corresponding bit segment when receiving the stuff time symbol, and for generating a stuff time informing signal;

a signal register, coupled to the signal decoder, for storing the bit segments sequentially and outputting the bit segment associated with the data field of the previously received signal segment when the signal decoder decodes the current inputting signal segment; and a signal encoder, coupled to the signal register, for receiving the bit segment, and transforming each of the bit segments to each of the corresponding signal segments before attaching the stuff time symbols to the data fields of each of the signal segments so that the stuff time symbols follow the data fields until the signal decoder begins to decode the next received signal segment subsequent to the currently received signal segment in the serial packet.

2. The single wire signal regeneration transmitting apparatus according to claim 1, wherein a time duration of each of the signal segments received by the single wire signal regeneration transmitting apparatus is the same as a time duration of each of the signal segments outputted by the single wire signal regeneration transmitting apparatus.

3. The single wire signal regeneration transmitting apparatus according to claim 1, wherein a time duration of each of the data fields outputted by the single wire signal regeneration transmitting apparatus is fixed, a duty cycle of each of the logic 0 signal symbols is fixed, and a duty cycle of each of the logic 1 signal symbols is fixed.

4. The single wire signal regeneration transmitting apparatus according to claim 1, wherein time duration of each of the stuff time symbols outputted by the single wire signal regeneration transmitting apparatus is adjustable.

5. The single wire signal regeneration transmitting apparatus according to claim 1, wherein the single wire signal regeneration transmitting apparatus is reset when failing to receive the serial packet within a predetermined period of time.

6. The single wire signal regeneration transmitting apparatus according to claim 1, wherein when the single wire signal regeneration transmitting apparatus processes a currently received signal segment, the single wire signal regeneration transmitting apparatus counts the logic 0/1 signal symbols in the data field of the currently received signal segment in order to generate a counting number before matching the counting number with a preset number, if the counting number does not match the preset number, the single wire signal regeneration transmitting apparatus stops outputting any signal segments until the single wire signal regeneration transmitting apparatus is reset and then the single wire signal transmitting apparatus receives and processes the next received signal segment normally.

7. The single wire signal regeneration transmitting apparatus according to claim 6, further comprising:
- a first controller, coupled to the signal decoder for receiving the serial packet and multiple stuff time informing signals, confirming the location of the stuff time symbol at the serial packet and counting a number of the logic 0 signal symbols and the logic 1 signal symbols between the two stuff time symbols for outputting a first control signal; and
- a selector, coupled to the signal encoder and the first controller, for receiving the signal segments outputted by the signal encoder, the first control signal, and an idle signal, and outputting one of the signal segments outputted by the signal encoder and the idle signal according to the first control signal.

8. The single wire signal regeneration transmitting apparatus according to claim 6, further comprising:
- a second controller, coupled to the signal decoder, for receiving the stuff time informing signal, and counting the stuff time symbols, in order to output a second control signal; and
- a signal processor, coupled to the signal register and the second controller to receive the bit segments in the signal register and the second control signal, and decide whether to copy the bit segments in the signal register according to the second control signal.

9. The single wire signal regeneration transmitting apparatus according to claim 6, further comprising:
- a detector, coupled to the signal decoder, for detecting whether the signal decoder receives the serial packet continuously in order to generate a reset signal to reset the single wire signal regeneration transmitting apparatus.

10. The serially connected single wire signal regeneration transmitting apparatuses having multiple single wire signal regeneration transmitting apparatuses including a first single wire signal regeneration transmitting apparatus recited in claim 1, wherein the first single wire signal regeneration transmitting apparatus receives each of data fields that are in a first time duration and outputs each of the data fields that are in a second time duration, which is shorter than the first time duration, and a time duration of a signal segment outputted by the single wire signal regeneration transmitting apparatus is substantially equal to a time duration of the signal segment received by the first single wire signal regeneration transmitting apparatus.

11. The serially connected single wire signal regeneration transmitting apparatus according to claim 10, wherein each of the signal segments in the serial packet corresponds to the single wire signal regeneration transmitting apparatuses one by one, and an order in which the single wire signal regeneration transmitting apparatuses are serially arranged is opposite to an order in which the signal segments are arranged in the serial packet.

12. A single wire signal regeneration transmitting method comprising:
- receiving a serial packet including a plurality of signal segments, wherein each of the signal segments includes a data field and a stuff time symbol, each of the data fields includes multiple logic 0/1 signal symbols, accumulated numbers of the logic 0/1 signal symbols in each of the data fields are the same, and each of the data fields is followed by one of the stuff time symbols, processing the serial packet to output the signal segments sequentially, and outputting the stuff time symbols continuously after outputting the data field from a previously received signal segment until starting to process a next received signal segment received subsequent to a currently received signal segment;
- receiving the serial packet and decoding each of the signal segments of the serial packet to generate a corresponding bit segment when receiving the stuff time symbol, and generating a stuff time informing signal;
- storing the bit segments sequentially and outputting the bit segment associated with the data field of the previously received signal segment when decoding the current inputting signal segment; and
- receiving the bit segment, and transforming each of the bit segments to each of the corresponding signal segments before attaching the stuff time symbols to the data fields of each of the signal segments so that the stuff time symbols follow the data fields until beginning to decode the next received signal segment subsequent to the currently received signal segment in the serial packet.

\* \* \* \* \*